United States Patent [19]
Ballantyne et al.

[11] Patent Number: 5,740,699
[45] Date of Patent: Apr. 21, 1998

[54] WRIST JOINT WHICH IS LONGITUDINALLY EXTENDIBLE

[75] Inventors: William John Ballantyne, Aurora; Bruce Clarke Walker, Bolton; Al-Amyn Samji, Thornhill, all of Canada

[73] Assignee: Spar Aerospace Limited, Brampton, Canada

[21] Appl. No.: 417,699

[22] Filed: Apr. 6, 1995

[51] Int. Cl.⁶ ..................................................... G05G 11/00
[52] U.S. Cl. .................. 74/490.06; 74/490.03; 403/291; 403/120; 901/23; 901/28
[58] Field of Search ............... 74/490.01, 490.03, 74/490.05, 490.06, 424.8 R, 89.15; 403/291, 111, 120; 901/23, 28, 29

[56] References Cited

U.S. PATENT DOCUMENTS

| | | |
|---|---|---|
| 3,813,089 | 5/1974 | Troeger . |
| 4,407,625 | 10/1983 | Shum ............................. 901/23 |
| 4,729,253 | 3/1988 | Rosheim . |
| 4,737,048 | 4/1988 | Herrstrom ........................ 403/291 |
| 4,739,241 | 4/1988 | Vachtsevanos et al. .......... 901/29 |
| 4,790,718 | 12/1988 | Vickers ........................... 901/23 |
| 4,819,496 | 4/1989 | Shelef ............................. 901/23 |
| 4,872,363 | 10/1989 | Rosenthal ........................ 901/23 |
| 5,053,687 | 10/1991 | Merlet ............................. 901/28 |
| 5,114,300 | 5/1992 | Shahinpoor et al. ............ 414/729 |
| 5,317,952 | 6/1994 | Immega . |
| 5,354,158 | 10/1994 | Sheldon et al. ................. 901/23 |
| 5,378,282 | 1/1995 | Pollard ............................ 901/23 |

OTHER PUBLICATIONS

Pp. 1 to 4 of an article entitled "Modeling of a Parallel Wrist Mechanism With Actuator Redundancy" by V. Hayward and R. Kurtz, printed in *Advances in Robot Kinematics* published by Springer Verlag.

*Primary Examiner*—Charles A. Marmor
*Assistant Examiner*—David A. Fenstermacher

[57] ABSTRACT

An extendible wrist mechanism comprises a base and a spaced end plate to which an end effector or other tool holder may be mounted. Three linear actuators are disposed about the central axis directed from the base to the end plate. Each actuator is joined to the base by a joint permitting pivoting toward and away from the central axis and pivoting tangentially of a circle centered about the central axis. Each linear actuator is mounted to the end plate by a joint permitting pitch, yaw, and roll of the end member with respect to the linear actuator. A tube extends from the base and telescopingly receives a member which is attached to the end plate at the central axis by a U-joint permitting pitch and yaw of the end plate. The base mounted tube is keyed to the end plate mounted member so that the end plate is held against rotation with respect to the base. With this arrangement, a selective amount of pitch and yaw may be imparted to an end effector mounted to the end plate and the end effector may also be extended and retracted as desired.

19 Claims, 5 Drawing Sheets

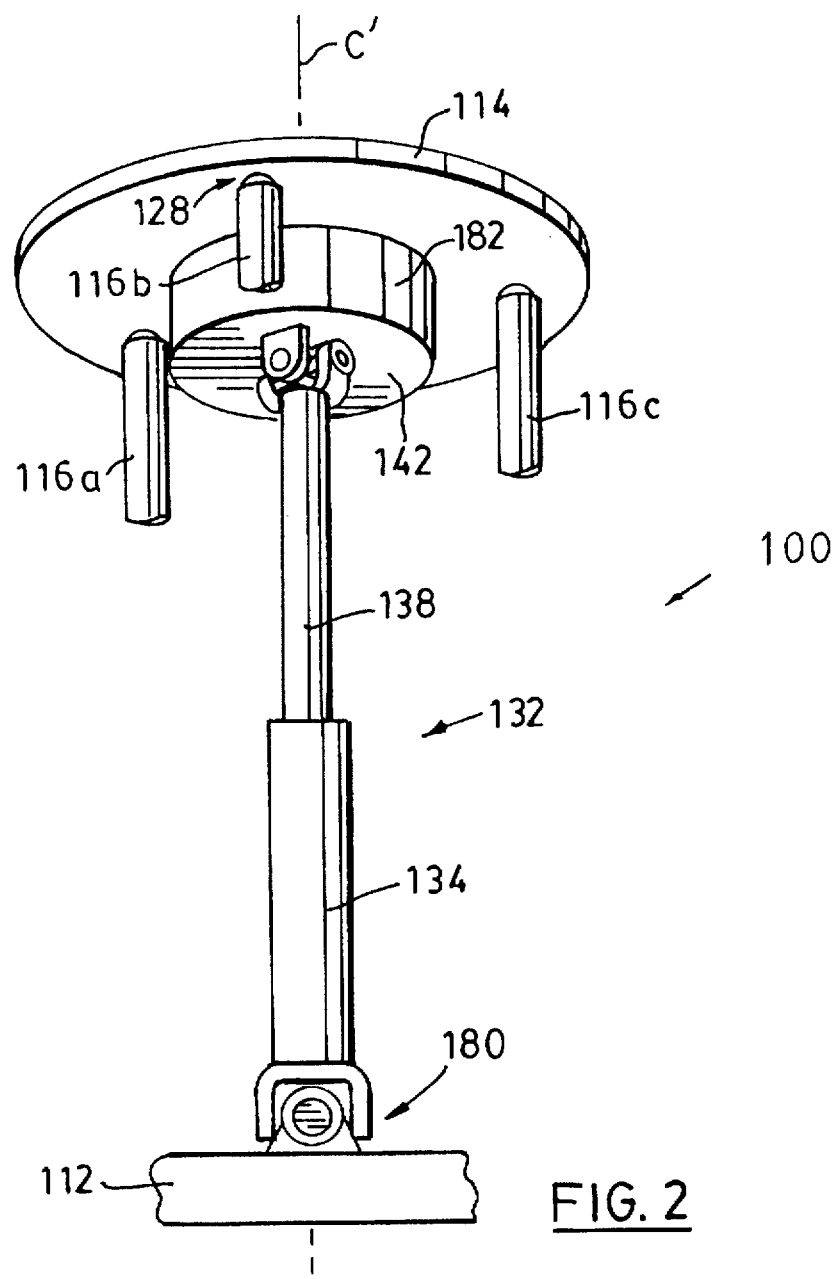

1
WRIST JOINT WHICH IS LONGITUDINALLY EXTENDIBLE

BACKGROUND OF THE INVENTION

1. Field of the Invention

This invention relates to an extendible wrist mechanism.

2. Description of the Related Art

A mechanical wrist mechanism is typically used with a robot arm in order to allow the end effector to pitch, yaw and roll. The robot arm is typically telescoping to provide for extension of the end effector. Such a mechanism is shown in U.S. Pat. No. 4,729,253 to Rosheim issued Mar. 8, 1988.

Mechanisms to provide the degrees of freedom for the end effector tend to be complicated and expensive, especially when all of the degrees of freedom which are provided are not necessary.

This invention seeks to overcome drawbacks of the known prior art.

SUMMARY OF THE INVENTION

According to the present invention, there is provided an extendible wrist mechanism comprising: a base; an end member; at least three linear actuators disposed about an axis directed from said base to said end member, each actuator being mounted at one end to said base by a joint permitting a second end of said actuator to pivot radially toward and away from said axis and to pivot tangentially with respect to a circle centered about said axis and being mounted at said second end to said end member by a joint permitting pitch, yaw, and roll; and an extendible member extending from said base and mounted to said end member by a joint permitting pitch and yaw, but not rotation, of said end member about said axis, said extendible member arranged to constrain said extendible member end member joint from movement in a direction transverse to said axis; and each said linear actuator end member joint and said extendible member end member joint lying in a common plane.

According to another aspect of this invention, there is provided an extendible wrist mechanism comprising: a base; an end member; at least two linear actuators disposed about an axis directed from said base to said end member, each actuator being mounted at one end to said base by a joint at least permitting another end of said actuator to pivot radially toward and away from said axis and being mounted at said another end to said end member by a joint, said at least two linear actuators being equally angularly spaced about said axis; a first member rigidly extending from said base toward said end member and centered about said axis; a second member keyed to said first member for sliding along said axis so that said first member constrains said second member from movement in a direction transverse to said axis; said second member mounted to said end member by a joint permitting tilting of said end member about said axis, said first member and said second member preventing rotation of said end member about said axis; each said linear actuator end member joint and said second member end member joint lying in a common plane; and said linear actuator joints and said second member joint arranged to permit said end member to tilt as the linear actuators differentially extend or retract.

BRIEF DESCRIPTION OF THE DRAWINGS

In the drawings which illustrate example embodiments of the subject invention,

2

Figure 1:
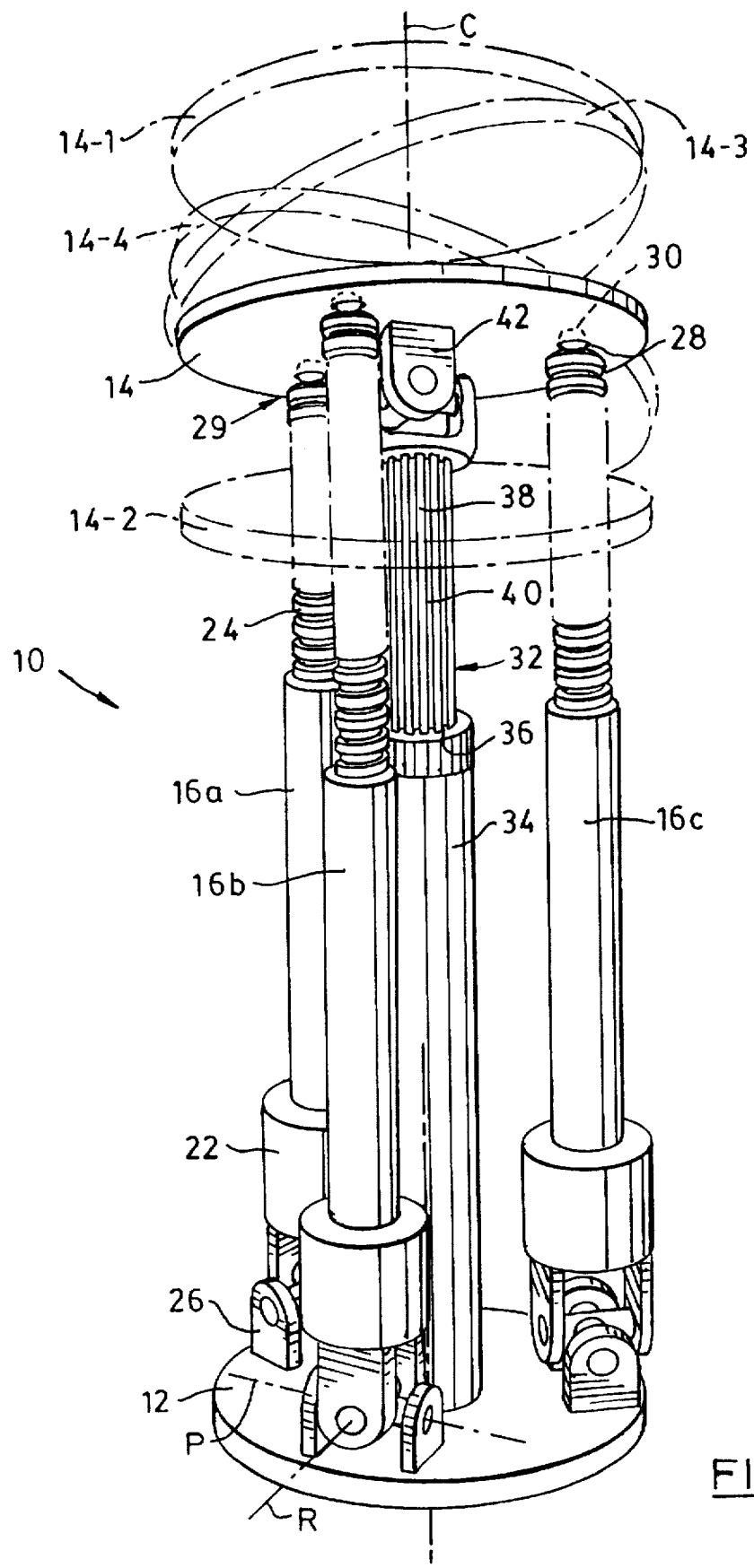
Figure 1A:
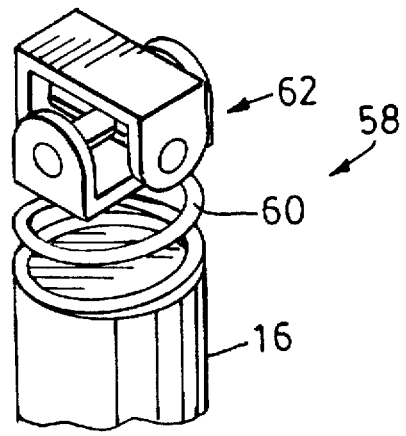
Figure 1B:
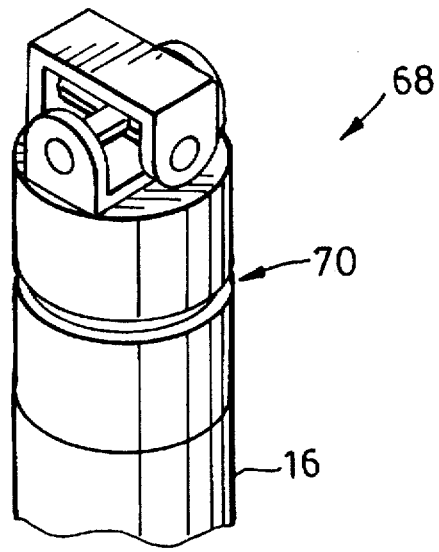
Figure 3:
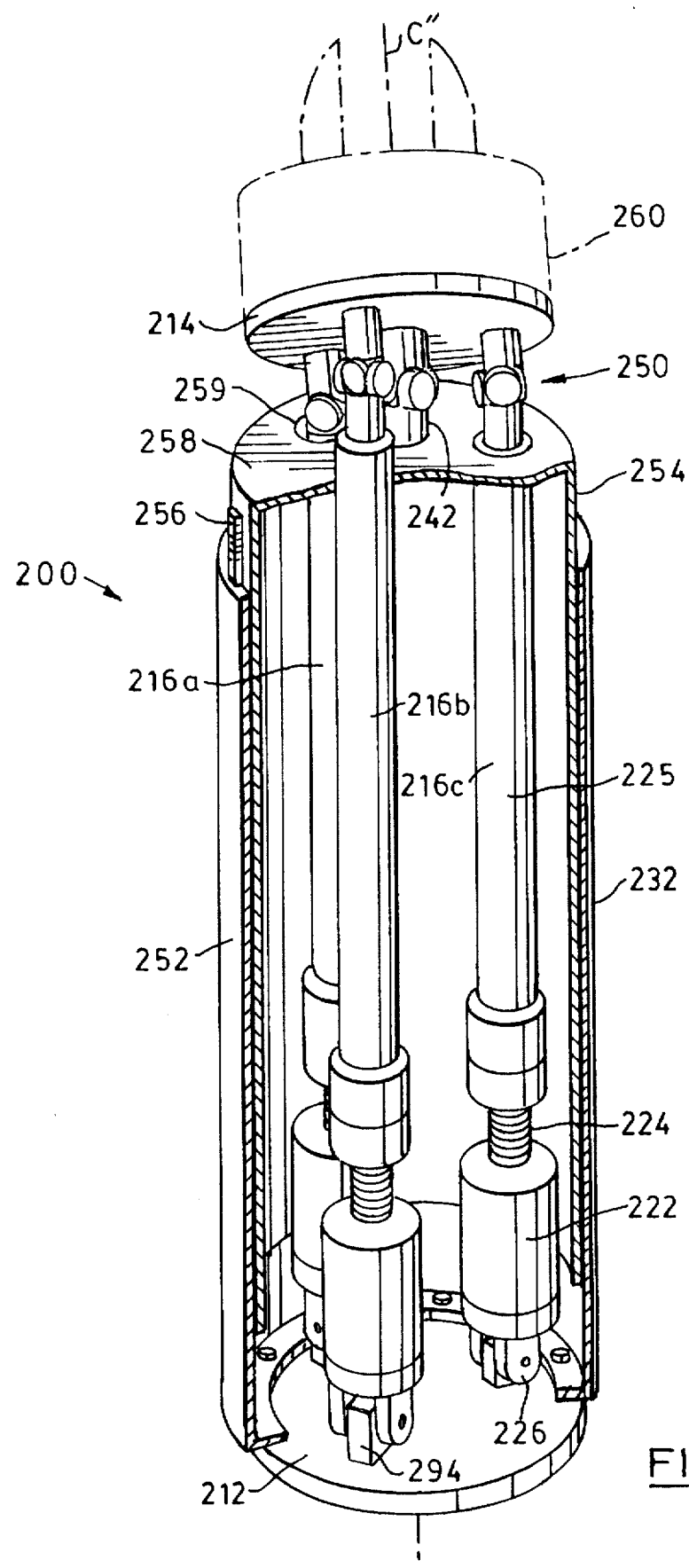
Figure 3A:
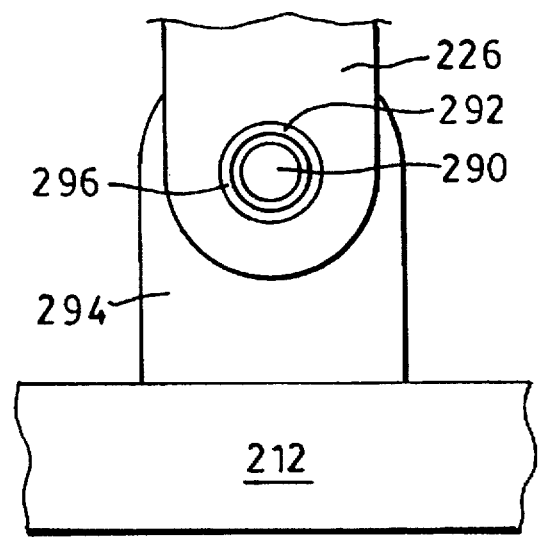

FIG. 1 is a perspective view of an extendible wrist mechanism made in accordance with one aspect of this invention, FIG. 1a is a perspective fragmentary view of an alternate embodiment for the mechanism of FIG. 1, FIG. 1b is a perspective fragmentary view of a further alternate embodiment for the mechanism of FIG. 1, FIG. 2 is a partial perspective view of an extendible wrist mechanism made in accordance with another aspect of this invention, FIG. 3 is a partially sectioned perspective view of an extendible wrist mechanism made in accordance with a further aspect of this invention, and FIG. 3a is a fragmentary side view of a portion of FIG. 3.

DETAILED DESCRIPTION OF THE PREFERRED EMBODIMENTS

With reference to FIG. 1, an extendible wrist mechanism indicated generally at 10 comprises a base 12 and an end plate 14. Three linear actuators 16a, 16b, and 16c are disposed about a central axis C directed from the base to the end plate. Each linear actuator comprises a motor 22 and a ball screw 24. Linear actuators 16a, 16b, 16c are an "off-the-shelf" item and will be well-understood to those skilled in the art. The motor 22 of each linear actuator is mounted by a universal joint in the nature of U-joint 26 to base 12. Each U-joint is oriented such that it has a pivot axis R radially extending from axis C and a pivot axis P perpendicular to radial axis R. Consequently, each U-joint permits the end 29 of a linear actuator to pivot radially toward and away from axis C and also permits end 29 of each actuator to pivot tangentially with respect to a notional circle centered at axis C. End 29 of each linear actuator is mounted to end plate 14 by a spherical joint 28 comprising a ball 30 received within a corresponding socket in end plate 14. An extendible means indicated generally at 32 comprises a tube 34 extending rigidly from base 12 along axis C. The tube has internal splines 36. A shaft 38 with splines 40 is telescopingly received within tube 34. Shaft 38 terminates in a universal joint comprising U-joint 42 between the shaft 38 and end plate 14. It will be noted that the pivot centers of joints 28 and 42 lie in a common plane.

An end effector (not shown) may be mounted to end plate 14 and base 12 may be mounted to the end of a robot arm.

In operation, if all three motors 22 of linear actuators 16a, 16b, 16c are activated so as to turn their respective ball screws 24 in a counter-clockwise direction, then the end plate is extended from its solid line position indicated in FIG. 1 toward extended position 14-1. Similarly, if motors 22 are activated so as to turn their respective ball screws 24 in a clockwise orientation, then the end plate is retracted toward position 14-2.

If linear actuator 16c is operated to extend its ball screw at a faster rate than that of linear actuator 16a and 16b, or the latter linear actuators remain dormant or are operated in the opposite direction, then end plate 14 will be canted toward position 14-3. Because each spherical joint 28 is a three degree of freedom joint, the spherical joints of the linear actuators allow the plate to cant. As the end plate cants, the U-joints 26 of the linear actuators allow these actuators to tilt radially inwardly toward axis C and to tilt about their radial axes R to accommodate the effective lateral foreshortening of the end plate. By various differential drive rates of the linear actuators, varying pitch and yaw combinations for the end plate may be achieved such as, for example, position 14-4 indicated in FIG. 1 for the end plate.

The extendible means 32 prevents rotation of end plate 14 with respect to the base during operation, as follows. U-joint 42 has two degrees of freedom, in pitch and yaw, which permits canting of the end plate while preventing rotation of the end plate with respect to shaft 38. The splined connection between shaft 38 and tube 34 prevents rotation of shaft 38 within tube 34. Therefore, since tube 34 is rigidly joined to base 12, the end plate cannot rotate with respect to the base.

It is preferred that the U-joints 26 are positioned so that the linear actuators are equally angularly spaced about axis C, 120 degrees apart from each other. This symmetrical arrangement optimizes the strength of the wrist mechanism for use when there are no operational restrictions for the orientations which will be assumed by end plate 14. However, other angular spacings between the linear actuators will provide a functioning mechanism. It is also preferred that the U-joint 42 of the extendible means be centered at axis C in order to simplify the kinematics of the mechanism 10.

While a spherical joint is a convenient inexpensive joint between the linear actuators and the end plate, other three degree of freedom joints are possible. For example, with reference to FIG. 1a, three degree of freedom joint 58 may be substituted. This joint comprises a torsional joint, in the nature of a spring 60, affixed to a linear actuator 16, and a universal joint, in the nature of U-joint 62, affixed to the spring. As a further alternative, with reference to FIG. 1b, the torsional joint of three degree of freedom joint 68 comprises a flexural pivot 70. The structure of a flexural pivot will be well understood by those skilled in the art and is described in U.S. Pat. No. 3,813,089, the contents of which are incorporated herein by reference. The amount of torsional freedom which must be provided by the three degree of freedom joint is small. Consequently, it may be possible to interconnect the end plate and each linear actuator with a universal joint and rely on the "play" present along the length of the linear actuator and in the U-joint 26 to provide the needed torsional freedom. In such instance, the innate torsional freedom of the linear actuator and U-joint 26 act as a joint.

The degree of tangential freedom required by each linear actuator is small. Therefore, U-joints 26 could be replaced with clevis mounts each oriented to allow rotation of end 29 of an actuator about pivot axes P and the requisite tangential freedom provided by installing the clevis mounts on a modestly compliant footing. Alternatively, the needed tangential freedom could be obtained by providing each pair of clevis mounts with spring loaded bearings to support pivot pins which extend from the linear actuator.

While a ball screw linear actuator is preferred because of its smooth torque transmission characteristics and high efficiency, any linear actuator, such as a roller screw or acme screw linear actuator, will suffice. Furthermore, it will be apparent that, rather than a robot end effector, any tool holder may be attached to end plate 14 of extendible wrist mechanism 10.

Turning to FIG. 2, which illustrates an alternate embodiment of the invention, similarly to extendible wrist mechanism 10 of FIG. 1, mechanism 100 has a base 112 and an end member 114 with three linear actuators 116a, 116b, and 116c disposed about a central axis C' and joined to the end member 114 by spherical joints 128. Extendible means, comprising a tube 134, is joined by a universal joint 180 to base 112 at central axis C'. The universal joint 180 comprises a two degree of freedom pivoting U-joint. The universal joint 180 provides the extendible means with a small amount of freedom to decline with respect to central axis C' which permits the end member 114 to be displaced transversely of axis C'. The required declinational freedom depends upon the geometry of mechanism 100 but is typically between one and two degrees. The tube 134 is slidingly keyed to shaft 138 and shaft 138 terminates in a universal joint in the nature of U-joint 142 joining shaft 138 to end member 114. Because of extension 182 of end member 114, it will be noted that the pivot centers of joints 128 lie in a plane above that of the pivot center of joint 142.

The operation of the wrist mechanism 100 of FIG. 2 is identical to that of mechanism 10 of FIG. 1 except that, because the pivot centers of joints 128 are not in the same plane as the pivot center of joint 142, extendible means 132 will decline by a small amount from axis C' as the end member 114 is canted. Universal joint 180 permits this declination while preventing rotation of the base plate 112 with respect to the end member 114.

Because the amount of declinational freedom required by extendible means 132 is small, there may be sufficient freedom provided by the "play" along the length of the telescoping means such that universal joint 180 may not be necessary.

Turning to FIG. 3 which illustrates a further alternate extendible wrist mechanism 200, three linear actuators 216a, 216b, and 216c are disposed about a central axis C" extending between base 212 and end plate 214. Clevis mounts 226 extending from the motor 222 of each linear actuator receive pins extending from ears 294 of base 212 so as to permit the linear actuators to pivot toward and away from central axis C". As seen in FIG. 3a, a pin 290 extending from an ear 294 of base 212 is received within the eye 292 of each clevis mount 226 and a spring 296 compliantly supports the pin 290 within eye 292. Returning to FIG. 3, the ball screw 224 of each linear actuator is threaded to a tube 225 which terminates in a U-joint 250 between the tube 225 and end plate 214. The play along the length of the linear actuators and in the clevis mount provides the needed torsional freedom between the linear actuator and the end plate. An extendible means 232 comprises a sleeve 252 which is mounted to base 212 and surrounds the linear actuators 222. Sleeve 252 telescopingly receives sleeve 254. Key 256 in sleeve 254 is received within a keyway of sleeve 252. Sleeve 254 has an end cap 258 with a U-joint 242 joining the end cap 258 to end plate 214 at central axis C". The end cap has openings 259 through which the linear actuators 216a, 216b, 216c extend. An end effector 260 is shown in phantom attached to end plate 214. The end effector may include a powered "roll axis" to provide an additional degree of freedom to the mechanism; this additional degree of freedom is typical of robot wrists.

Operation of mechanism 200 of FIG. 3 is similar to that of FIG. 1. More particularly, extension of the linear actuators will extend end plate 214 as sleeve 254 telescopes within sleeve 252. The extendible means 232 has the effect of preventing rotation of end plate 214 with respect to base 212. (That is, the key 256 of sleeve 254 and the keyway within sleeve 252 prevents rotation of sleeve 254 with respect to sleeve 252 and the U-joint 242 between sleeve 254 and end plate 214 prevents rotation of the end plate with respect to the sleeve 254 about axis C".) If the linear actuators 216a, 216b, 216c are rotated at different rates, then some pitch and yaw combination will be imparted to end plate 214 as is shown, for example, in FIG. 3. The U-joints 250 between the linear actuators and the end plate provide two degrees of freedom, in pitch and yaw, between the linear actuators and the end plate; the play along the length of the actuators and in the clevis mounts provides a limited rotational degree of freedom. Clevis mounts 226 allow the linear actuators to tilt toward and away from central axis C", and to tilt tangentially with respect to a notional circle centered about axis C", as necessary when the effective lateral extent of the end plate 214 changes as it pitches an/or yaws. The openings 259 in the end cap 258 are sized to allow this tilting of the actuators. U-joint 242 of the extendible means 232 permits pitch and yaw of the end plate 214 about central axis C".

From the operation described, it will be apparent that the extendible wrist mechanisms of this invention allow for extension and retraction of an end effector as well as pitch and yaw of the end effector. The mechanisms are of simple construction and, therefore, of relatively low cost manufacture. The mechanisms do not allow roll of the end effector about central axis C (FIG. 1), C' (FIG. 2), or C" (FIG. 3). If roll is a required degree of freedom for the end effector, the aforenoted powered roll axis may be provided.

While pitch and yaw may be imparted to the end plate with a minimum of three linear actuators, four or more linear actuators could be employed.

If only one angular degree of freedom (yaw or pitch) is required for the end plate (in addition to its translational freedom), then only two linear actuators are required. However, the two linear actuators must be equally angularly spaced about the axis between the base and end plate so that the axis and the two linear actuators lie in a common plane. Further, the joint between the extendible means and the end plate will be a pivot joint oriented to permit tilting of the end plate in this common plane.

While the extendible means of the illustrative embodiments comprise telescoping members, scissor arms could be substituted.

Other modifications will be apparent to those skilled in the art and, therefore, the invention is defined in the claims.

What is claimed is:

1. An extendible wrist mechanism comprising:
   a base;
   an end member;
   at least three linear actuators disposed about an axis directed from said base to said end member, each actuator being mounted at one end to said base by a joint permitting a second end of said actuator to pivot radially toward and away from said axis and to pivot tangentially with respect to a circle centered about said axis and being mounted at said second end to said end member by a joint permitting pitch, yaw, and roll;
   an extendible member extending from said base and mounted to said end member by a joint permitting pitch and yaw, but not rotation, of said end member about said axis, said extendible member to constraining said end member from movement in a direction transverse to said axis; and
   each said linear actuator end member joint and said extendible member end member joint lying in a common plane.

2. The extendible wrist mechanism of claim 1 wherein said linear actuator end member joint comprises one of a spherical joint and a universal joint with a torsional joint.

3. The extendible wrist mechanism of claim 1 wherein said extendible member comprises a first member rigidly extending from said base toward said end member centered about said axis and a second member slidably keyed to said first member and mounted to said end member by said extendible member end member joint.

4. The extendible wrist mechanism of claim 1 wherein said extendible member end member joint comprises a universal joint.

5. The extendible wrist mechanism of claim 4 wherein said joint mounting said actuator to said base comprises a universal joint.

6. The extendible wrist mechanism of claim 4 wherein said joint mounting said actuator to said base comprises clevis mounts having eyes receiving pivot pins and oriented to permit said actuator second end to pivot radially toward and away from said axis, said clevis mount eyes supporting springs bearing against said pins, said springs permitting said actuator second end to pivot tangentially of a circle centred about said axis.

7. The extendible wrist mechanism of claim 1 wherein said linear actuators are equally angularly spaced about said axis.

8. The extendible wrist mechanism of claim 7 wherein said first member and said second member each comprise a tube surrounding said actuators.

9. The extendible wrist mechanism of claim 7 wherein one of said first member and said second member comprises a tube extending along said axis, said tube having internal splines, and wherein the other of said first member and said second member comprises a splined shaft.

10. The extendible wrist mechanism of claim 1 wherein said extendible means is arranged to permit said end member to be displaced transversely of said axis.

11. The extendible wrist mechanism of claim 10 wherein said extendible means comprises a first member extending from said base toward said end member and a second member slidably keyed to said first member and mounted to said end member by said extendible means end member joint and wherein said arrangement to permit said end member to be displaced transversely of said axis comprises a universal joint between said base and said first member.

12. The extendible wrist mechanism of claim 11 wherein said linear actuator end member joint comprises one of a spherical joint and a universal joint with a torsional joint.

13. The extendible wrist mechanism of claim 12 wherein said extendible means end member joint means comprises a universal joint.

14. The extendible wrist mechanism of claim 13 wherein said linear actuators are equally angularly spaced about said axis.

15. The extendible wrist mechanism of claim 14 wherein said joint mounting said actuator to said base comprises clevis mounts having eyes receiving pivot pins and oriented to permit said actuator second end to pivot radially toward and away from said axis, said clevis mount eyes supporting springs bearing against said pins, said springs permitting said actuator second end to pivot tangentially of a circle centered about said axis.

16. The extendible wrist mechanism of claim 14 wherein said joint mounting said actuator to said base comprises a universal joint.

17. An extendible wrist mechanism comprising:
   a base;
   an end member;
   at least two linear actuators disposed about an axis directed from said base to said end member, each actuator being mounted at one end to said base by a joint at least permitting another end of said actuator to pivot radially toward and away from said axis and being mounted at said another end to said end member by a joint, said at lease two linear actuators being equally angularly spaced about said axis;

a first member rigidly extending from said base toward said end member and centered about said axis;

a second member keyed to said first member for sliding along said axis so that said first member constrains said second member from movement in any direction transverse to said axis;

said second member mounted to said end member by a joint permitting tilting of said end member about said axis, said first member and said second member preventing rotation of said end member about said axis;

each said linear actuator end member joint and said second member end member joint lying in a common plane; and said linear actuator joints and said second member joint arranged to permit said end member to tilt as the linear actuators differentially extend or retract.

18. The extendible wrist mechanism of claim 17 wherein:

said at least two linear actuators comprise at least three linear actuators;

each said linear actuator end member joint comprises a joint permitting yaw, pitch, and roll;

said second member end member joint comprises a universal joint permitting pitch and yaw of said end member about said axis; and said linear actuator base joint is arranged to permit said another end of said actuator to pivot tangentially with respect to a circle centred about said axis.

19. The extendible wrist mechanism of claim 18 wherein each said linear actuator end member joint comprises one of a spherical joint and a universal joint with a torsional joint and wherein each said linear actuator base joint comprises one of a universal joint and clevis mounts receiving pins within eyes having pin spring bearings.

* * * * *

UNITED STATES PATENT AND TRADEMARK OFFICE
CERTIFICATE OF CORRECTION

PATENT NO. : 5,740,699
DATED : April 21, 1998
INVENTOR(S) : William John Ballantyne, et al.

It is certified that error appears in the above-identified patent and that said Letters Patent is hereby corrected as shown below:

Claim 1, column 5, line 53, cancel "to" after member and before constraining.

Claim 17, column 6, line 66, cancel "lease" and insert --least--.

Signed and Sealed this

Seventh Day of July, 1998

Attest:

BRUCE LEHMAN

Attesting Officer

Commissioner of Patents and Trademarks